United States Patent
Zhao et al.

(10) Patent No.: US 10,665,088 B2
(45) Date of Patent: May 26, 2020

(54) SYSTEMS AND METHODS FOR PRIORITIZING WIRELESS COMMUNICATION

(71) Applicant: MOTOROLA SOLUTIONS, INC., Chicago, IL (US)

(72) Inventors: Dong Zhao, Sichuan (CN); Yong Tian, Sichuan (CN); Kang-Kai Zhao, Sichuan (CN)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/339,316

(22) PCT Filed: Oct. 26, 2016

(86) PCT No.: PCT/CN2016/103374
§ 371 (c)(1),
(2) Date: Apr. 3, 2019

(87) PCT Pub. No.: WO2018/076201
PCT Pub. Date: May 3, 2018

(65) Prior Publication Data
US 2019/0236932 A1    Aug. 1, 2019

(51) Int. Cl.
| | | |
|---|---|---|
| *G08B 27/00* | (2006.01) | |
| *H04W 4/90* | (2018.01) | |
| *H04W 4/80* | (2018.01) | |
| *H04W 4/38* | (2018.01) | |

(Continued)

(52) U.S. Cl.
CPC ......... *G08B 27/006* (2013.01); *G08B 25/016* (2013.01); *H04H 20/59* (2013.01);
(Continued)

(58) Field of Classification Search
CPC .... G08B 27/006; G08B 25/016; G08B 7/066; H04L 67/322; H04W 4/12
(Continued)

(56) References Cited

U.S. PATENT DOCUMENTS

| | | | |
|---|---|---|---|
| 7,855,639 B2 | 12/2010 | Patel et al. | |
| 8,432,797 B2 * | 4/2013 | Fonseca, Jr. .......... | H04L 47/805 370/230 |

(Continued)

FOREIGN PATENT DOCUMENTS

| | | |
|---|---|---|
| CN | 103918285 | 7/2014 |
| CN | 103999117 | 8/2014 |

(Continued)

OTHER PUBLICATIONS

PCT/CN2016/103374 International Search Report and Written Opinion of the International Searching Authority dated Jul. 17, 2017 (11 pages).

(Continued)

*Primary Examiner* — Omar Casillashernandez
(74) *Attorney, Agent, or Firm* — Michael Best & Friedrich LLP (57) ABSTRACT

A system and method for prioritizing a wireless communication to a portable communication device (102). In one example, a sensor (121) includes an electronic processor configured to capture an over-the-air identifier (404_1) of a portable communication device (102), determine a capture parameter based on at least one of a count of a number of times of capturing the over-the-air identifier and a last time of capturing the over-the-air identifier of the portable communication device (102), assign a priority level (414_1) to the portable communication device (102) based on the capture parameter, and prioritize the wireless communication between the sensor and the portable communication device (102) based on the priority level (414_1) assigned to the portable communication device (102).

20 Claims, 6 Drawing Sheets

(51) Int. Cl.
    *G08B 25/01*     (2006.01)
    *H04H 20/59*     (2008.01)
    *H04W 4/12*     (2009.01)
    *H04W 4/33*     (2018.01)
    *G08B 7/06*     (2006.01)
    *H04L 29/08*     (2006.01)

(52) U.S. Cl.
    CPC ............... *H04W 4/38* (2018.02); *H04W 4/80* (2018.02); *H04W 4/90* (2018.02); *G08B 7/066* (2013.01); *H04L 67/322* (2013.01); *H04W 4/12* (2013.01); *H04W 4/33* (2018.02)

(58) Field of Classification Search
    USPC .................................................... 340/539.11
    See application file for complete search history.

(56) References Cited

U.S. PATENT DOCUMENTS

| | | | |
|---|---|---|---|
| 8,768,315 B2 | 7/2014 | Miller et al. | |
| 9,084,103 B2 * | 7/2015 | Monks | ....................... G01S 5/02 |
| 2008/0207183 A1 * | 8/2008 | Root | ..................... H04L 67/306 |
| | | | 455/414.2 |
| 2009/0170529 A1 | 7/2009 | Kane | |
| 2009/0312045 A1 * | 12/2009 | Miller | ..................... H04W 4/08 |
| | | | 455/519 |
| 2014/0226532 A1 * | 8/2014 | Abbate | .................. H04W 4/90 |
| | | | 370/259 |
| 2015/0304283 A1 | 10/2015 | Hallett et al. | |

FOREIGN PATENT DOCUMENTS

| | | |
|---|---|---|
| CN | 104541529 | 4/2015 |
| WO | 2014039241 | 3/2014 |

OTHER PUBLICATIONS

International Preliminary Report on Patentability dated Apr. 30, 2019 for corresponding International Application No. PCT/CN2016/103374 (4 pages).

* cited by examiner

| ENTRY NUMBER 402 | DEVICE'S MAC ADDRESS 404 | FREQUENCY OF VISIT 406 | DEVICE'S LAST VISIT TIME 408 | COUNT OF # OF TIME RECORD 410 | ESTIMATED FAMILIARITY LEVEL 412 | PRIORITY LEVEL 414 |
|---|---|---|---|---|---|---|
| DEVICE_1 | A4-C4-94-C6-A8-12 404_1 | EVERY WORKING DAY | 5/19/2016 | 44 | EXTREMELY HIGH | LOWEST 414_1 |
| DEVICE_2 | FC-3F-DB-A3-1D-14 404_2 | EVERY WEAK | 5/13/2016 | 25 | HIGH | LOW 414_2 |
| DEVICE_3 | D2-62-E9-A1-S4-90 404_3 | EVERY MONTH | 4/18/2016 | 9 | LOW | HIGH 414_3 |
| DEVICE_4 | 94-F3-E2-6D-2A-32 404_4 | FIRST TIME VISIT | NONE | 0 | EXTREMELY LOW | HIGHEST 414_4 |

SYSTEMS AND METHODS FOR PRIORITIZING WIRELESS COMMUNICATION

BACKGROUND OF THE INVENTION

During an emergency incident (for example a building fire, a criminal pursuit or other law enforcement activity, a natural disaster, a medical incident, an accident, and the like) it may be necessary to evacuate one or more individuals at or near the incident scene. During an emergency incident, increases in radio communications and other communication traffic may cause network congestion.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The importance of an evacuation may increase when an emergency incident occurs in or around large buildings. Network congestion that occurs during an emergency incident may prevent portable communication devices from reliably communicating with one another. Currently available portable communication systems and techniques are not always capable of handling such congestion, particularly when it is necessary to communicate an evacuation route to people located within the vicinity of the emergency incident.

Accordingly, some embodiments provide systems and methods that prioritize communications to help facilitate the communication of evacuation routes during an emergency incident.

In one example, when mass evacuation happens in the building, evacuees determine their evacuation route based on their knowledge of the evacuation area and its surroundings. For evacuees working daily in the building, their familiarity level for the building may be "Extremely High." As a result, these evacuees may be able to easily and safely evacuate without needing any additional help. For evacuees who often visit the building, their familiarity level for the building may be "High." As a result, these evacuees may also be able to evacuate without much trouble or with requiring minimal help. For those evacuees who are visiting the building for the first time, their familiarity level for the building is "Extremely Low." In the event of an emergency, evacuees with an Extremely Low familiarity level for a building may try to escape in random directions and mistakenly may travel to hazardous areas. Accordingly, such evacuees require additional help in determining evacuation routes, which help them to avoid danger.

One exemplary embodiment provides a method for prioritizing a wireless communication to a portable communication device. The method includes operating one or more sensors. The method also includes capturing, with the one or more sensors, an over-the-air identifier of the portable communication device. The method also includes determining, with an electronic processor, a capture parameter based on at least one of a count of a number of times of capturing the over-the-air identifier and a last time of capturing the over-the-air identifier of the portable communication device. The method further includes assigning, with the electronic processor, a priority level to the portable communication device based on the count of the number of times of capturing the over-the-air identifier. The method includes prioritizing, with the electronic processor, the wireless communication between the one or more sensors and the portable communication device based on the priority level assigned to the portable communication device, wherein the priority level is associated with a quality of service of a communication channel between the one or more sensors and the portable communication device.

Another exemplary embodiment provides a sensor comprising an electronic processor configured to capture an over-the-air identifier of a portable communication device, determine a capture parameter based on at least one of a count of a number of times of capture of the over-the-air identifier and a last time of capturing the over-the-air identifier of the portable communication device, assign a priority level to the portable communication device based on the capture parameter, and prioritize the wireless communication between the sensor and the portable communication device based on the priority level assigned to the portable communication device. In some embodiments, the priority level is associated with a quality of service of a communication channel between the sensor and the portable communication device.

Another exemplary embodiment provides a method of controlling a communication channel during a congestion period. The method includes receiving, with a sensor, an over-the-air identifier of each of a plurality of portable communication devices. The method also includes determining, with an electronic processor, a capture parameter based on at least one of a count of a number of times the sensor receives the over-the-air identifier and a last time of capturing the over-the-air identifier of each of the plurality of portable communication devices. The method further includes assigning, by the electronic processor, a quality of service for the communication channel based on the capture parameter.

Figure 1:
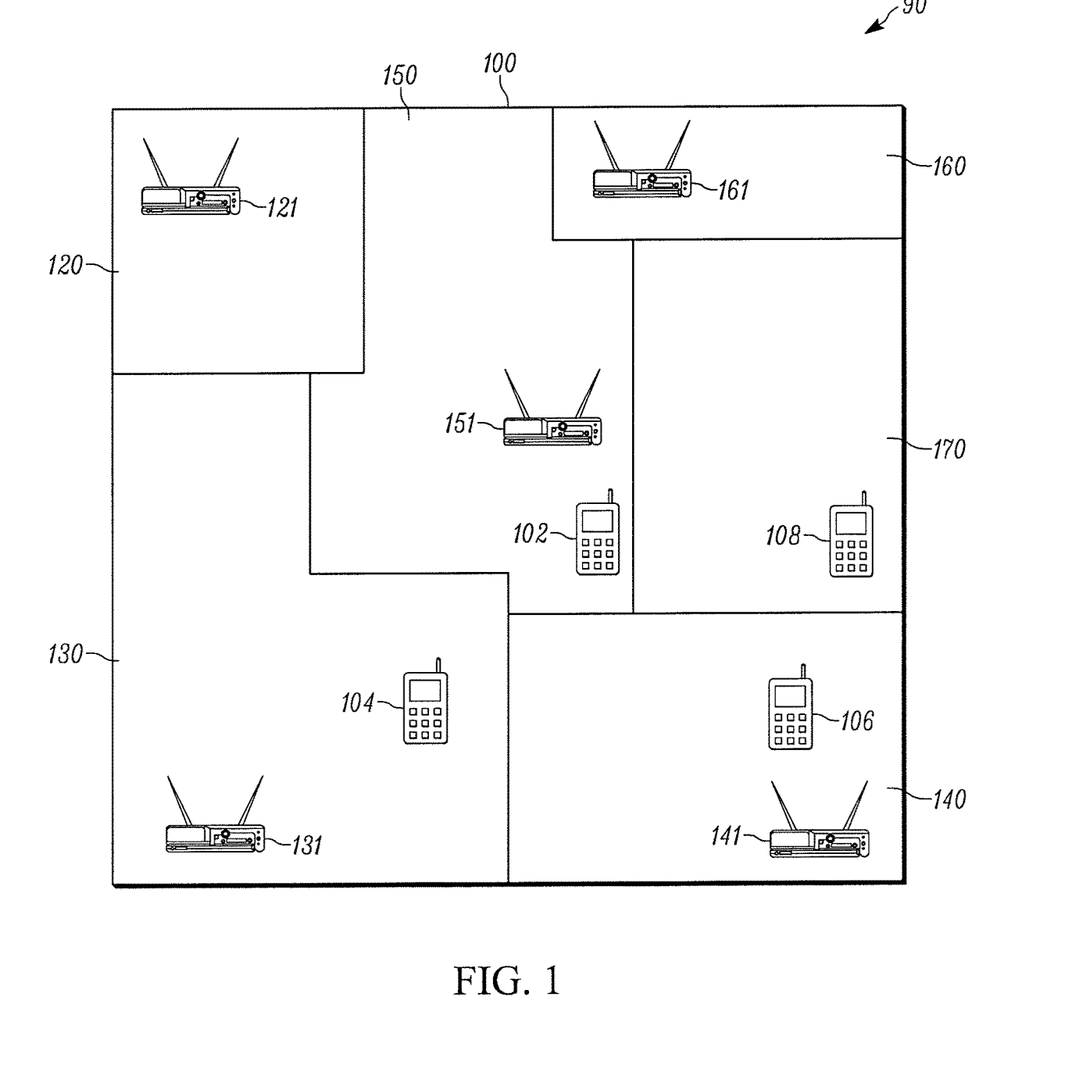
FIG. 1 illustrates an example deployment of a system for prioritizing wireless communication in a building in accordance with some embodiments.

FIG. 1 illustrates an example system 90 for prioritizing wireless communication within a building 100 in accordance with some embodiments. The building 100 includes different areas 120, 130, 140, 150, 160, and 170. These areas may include, for example, rooms, corridors, stairways, and the like. As shown in FIG. 1, the area 120 includes a sensor 121, the area 130 includes a sensor 131, the area 140 includes a sensor 141, the area 150 includes a sensor 151, and the area 160 includes a sensor 161. Also shown in FIG. 1 is a portable communication device 102 located within the area 150, a portable communication device 104 located within the area 130, a portable communication device 106 located within the area 140 and a portable communication device 108 located within the area 170. In some embodiments, each of the sensors 121, 131, 141, 151, and 161 includes one or more electronic processors that are configured to capture or receive, via a transceiver or similar device, an over-the-air identifier from a portable communication device 102, 104, 106, and 108. In some embodiments, the sensors 121, 131, 141, 151, and 161 are configured to determine a count of the number of times of capture of the over-the-air identifier. The sensors 121, 131, 141, 151, and 161 are also configured to assign a priority level to the portable communication device 102, 104, 106, and 108 based on the count of the number of times of capture of the over-the-air identifier. The sensors 121, 131, 141, 151, and 161 are also configured to prioritize the wireless communication between the sensor 121, 131, 141, 151, and 161 and the portable communication device 102, 104, 106, and 108 based on the priority level assigned to the portable communication device 102, 104, 106, and 108. In one example, prioritizing the wireless communication includes assigning a quality of service for a communication channel or channels between the sensors 121, 131, 141, 151, and 161 and the portable communication device 102, 104, 106, and 108.

Figure 2:
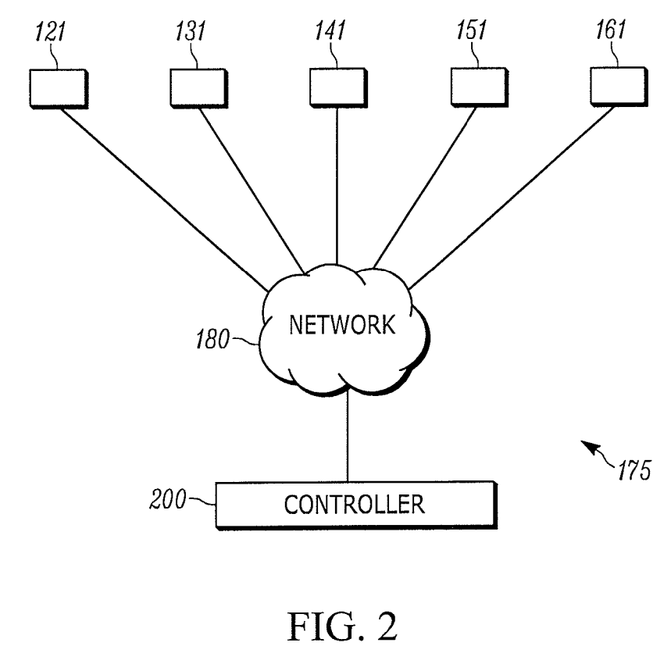
FIG. 2 is a block diagram of a system for prioritizing wireless communication in accordance with some embodiments.

FIG. 2 is a block diagram of a system 175 for prioritizing wireless communication in accordance with some embodiments. FIG. 2 includes sensors 121, 131, 141, 151, and 161 that are communicatively coupled to a network 180. Also shown in FIG. 2 is a controller 200, which is communicatively coupled to the network 180.

The sensors 121, 131, 141, 151, and 161 may conform to or be designed to support one or more wireless data communication protocols that are also supported by the network 180. Examples of suitable wireless data communication protocols include, without limitation, radio frequency (RF) protocols; infrared data association (IrDA) protocols; Bluetooth protocols; Institute of Electrical and Electronics Engineers (IEEE) 802.15.4-based protocols, variants of the Institute of Electrical and Electronic Engineers 802.16 standard, including the Worldwide Interoperability for Microwave Access (WiMAX) protocol; Third Generation Partnership Project (3GPP) Long Term Evolution (LTE) protocols; direct sequence spread spectrum protocols; frequency hopping spread spectrum protocols; cellular/wireless/cordless telecommunication protocols; wireless home network communication protocols; and paging network protocols. In an exemplary embodiment, the access point devices are preferably compliant with at least the Institute of Electrical and Electronics Engineers 802.11 communication protocol (for all referenced IEEE standards herein, see: http://standards.ieee.org/getieee802/index.html or contact the IEEE at IEEE, 445 Hoes Lane, Piscataway, N.J. 08855, USA) and configured to receive association requests for determining proximate devices and their associated media access control (MAC) addresses. In some embodiments, the sensors 121, 131, 141, 151, and 161 may be stand-alone devices or devices integrated into other devices. Examples of stand-alone devices include low-power, over-the-air-identifier sensors deployed in buildings. Examples of sensors 121, 131, 141, 151, and 161 integrated into other devices include access point devices, mobile devices with integrated sensors, other computing devices with integrated sensors, video cameras with integrated sensors, and the like. The sensors 121, 131, 141, 151, and 161 may be communicatively coupled to one another directly, via peering, or indirectly via the network 180. In one embodiment, sensors 121, 131, 141, 151, and 161 may be directly connected to the controller 200. In another embodiment, one or more of the sensors 121, 131, 141, 151, and 161 may include the controller 200. In yet another embodiment, one or more sensors 121, 131, 141, 151, and 161 may include an electronic processor similar to the electronic processor 202.

Figure 3:
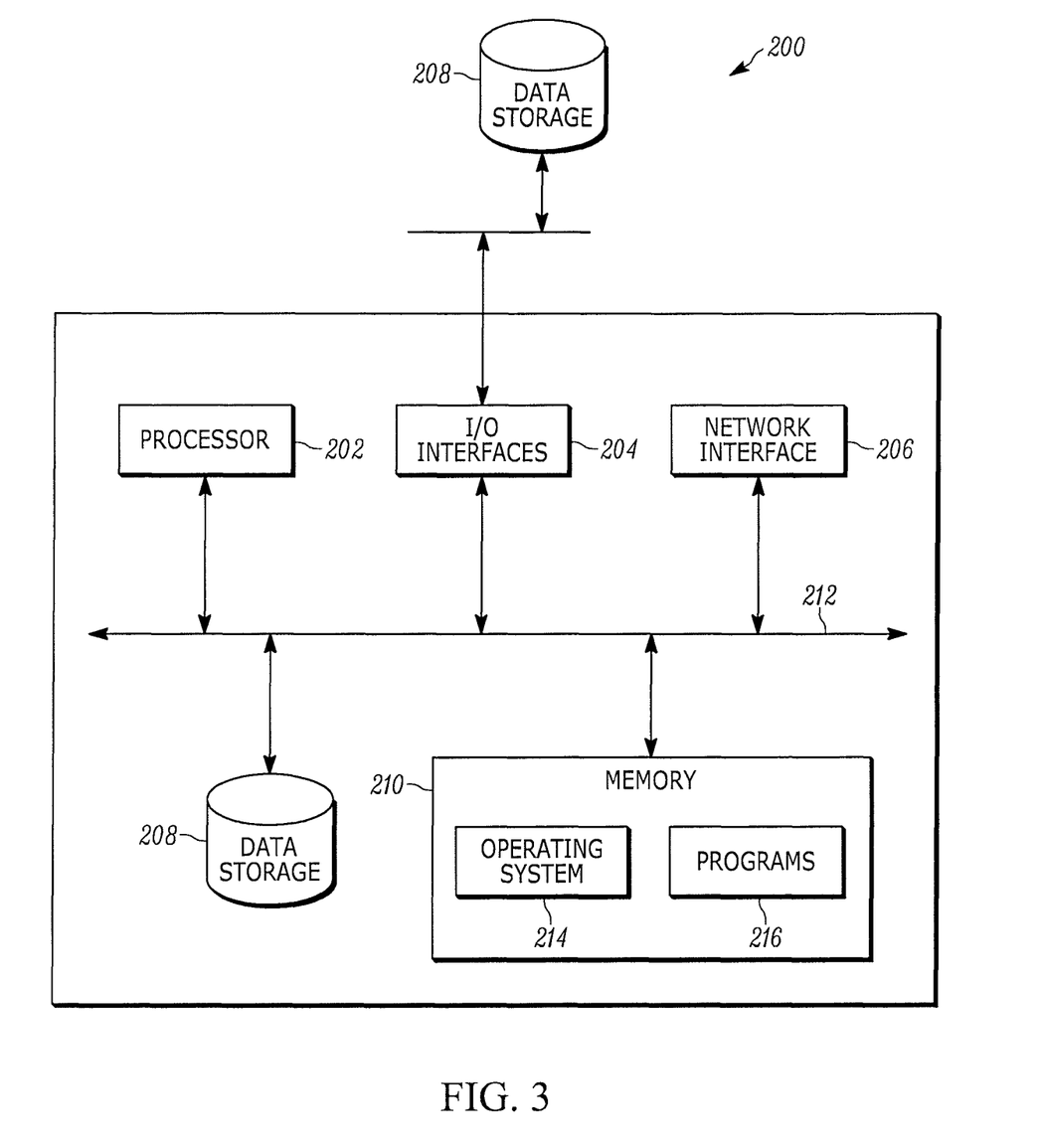
FIG. 3 is a block diagram of a controller shown in FIG. 2 in accordance with some embodiments.

FIG. 3 is a block diagram of the controller 200 shown in FIG. 2 in accordance with some embodiments. The controller 200 may be a digital computer that, in terms of hardware architecture, includes an electronic processor 202, input/output interfaces 204, a network interface 206, a data storage 208, and a memory 210. It should be appreciated by those of ordinary skill in the art that FIG. 3 depicts the controller 200 in a simplified manner, and a practical embodiment may include additional components and suitably configured processing logic to support known operating features that are not described in detail herein. The electronic processor 202, the input/output interfaces 204, the network interface 206, the data storage 208, and the memory 210 are communicatively coupled via a local bus 212. The local bus 212 may be, for example, one or more buses or other wired or wireless connections, as is known in the art. The local bus 212 may have additional elements, which are omitted for simplicity, such as controllers, buffers (for example, caches), drivers, repeaters and receivers, or other similar components, to enable communications. The local bus 212 may also include address, control, data connections, or a combination of the foregoing to enable appropriate communications among the aforementioned components.

In some embodiments, the electronic processor 202 is a hardware device designed to execute software instructions. The electronic processor 202 may be a custom-made or commercially-available electronic processor, a central processing unit (CPU), an auxiliary electronic processor among several electronic processors associated with the controller 200, a semiconductor-based microprocessor (for example, in the form of a microchip or a chip set), or other device. In some embodiments, the electronic processor 202 is configured to execute software stored within the memory 210, to communicate data to and from the memory 210, and to generally control operations of the controller 200 pursuant to the software instructions to perform the methods described herein. The input/output interfaces 204 may be used to receive user input from, and to provide system output to, one or more devices or components. The user input may be provided via, for example, a keyboard, touch pad, a mouse, or some combination of the foregoing. The system output may be provided via a display device and a printer (not shown). The input/output interfaces 204 can include, for example, a serial port, a parallel port, a small computer system interface (SCSI), a Serial Advance Technology Attachment (SATA) interface, a Peripheral Component Interconnect (PCI) Express interface (PCI-x), an infrared (IR) interface, a radio frequency (RF) interface, and/or a universal serial bus (USB) interface.

The network interface 206 may be used to enable the controller 200 to communicate on the network 180, such as to communicate with other servers or sensors 121, 131, 141, 151, and 161. The network interface 206 can include, for example, an Ethernet card or adapter or a wireless local area network (WLAN) card or adapter (for example, Institute of Electrical and Electronic Engineers standard 802.11a/b/g/n). The network interface 206 may include address, control, and/or data connections to enable appropriate communications on the network. A data storage 208 is communicatively coupled to a local bus 212. The data storage 208 may include volatile memory elements (for example, random access memory (RAM)) and nonvolatile memory elements (for example, read only memory (ROM)), and combinations thereof. Moreover, the data storage 208 can incorporate electronic, magnetic, optical, and/or other types of storage media. In one example, the data storage 208 may be located internal to the controller 200 such as, for example, an internal hard drive connected to the local bus 212 in the controller 200. Additionally, in another embodiment, the data storage 208 may be located external to the controller 200 such as, for example, an external hard drive connected to the input/output interfaces 204. In a further embodiment, the data storage 208 may be connected to the controller 200 through the network 180.

The memory 210 can include volatile memory elements (for example, random access memory (RAM), nonvolatile memory elements (for example, ROM), and combinations thereof. The memory 210 can have a distributed architecture, where various components are situated remotely from one another, but may be accessed by the electronic processor 202. The software in the memory 210 may include a suitable operating system 214 and one or more programs 216. The one or more programs 216 may be configured to implement the methods described herein.

In an exemplary embodiment, the controller 200 may be communicatively coupled to the sensors 121, 131, 141, 151, and 161 and configured to periodically receive data from the sensors 121, 131, 141, 151, and 161 related to over-the-air identifiers of interest. The controller 200 may be configured to analyze the received data. For example, the controller 200 may create a rank order of the received over-the-air identifiers based on the number of times the over-the-air identifiers have been received at the sensors 121, 131, 141, 151, and 161. In some embodiments, the controller 200 may rank the over-the-air identifiers based on the duration of the connectivity of the devices associated with the over-the-air identifiers. In some examples, the controller 200 may rank the over-the-air identifiers based on the location within the building 100 where the over-the-air identifiers were received by the sensors 121, 131, 141, 151, and 161.

Figure 4:
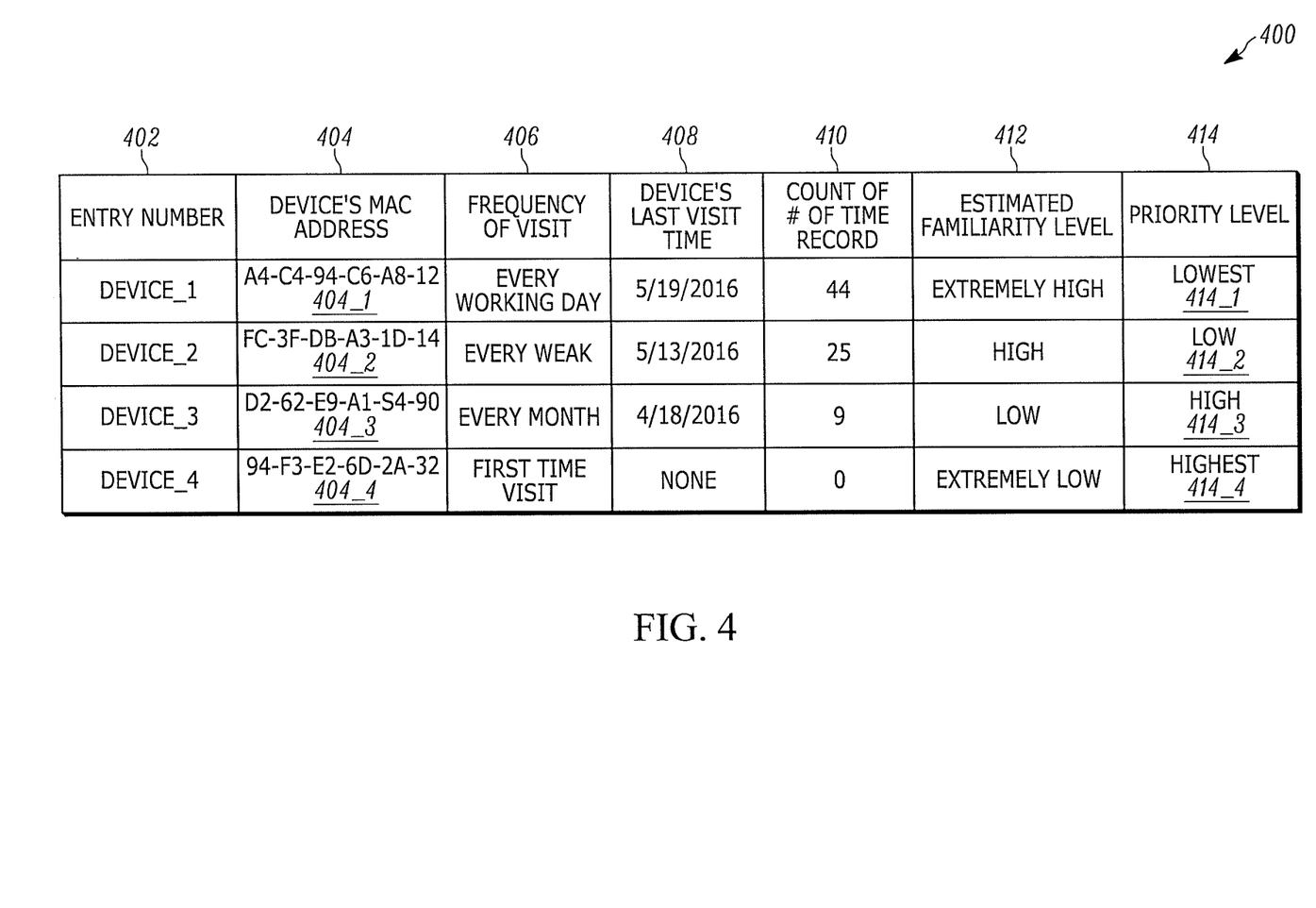
FIG. 4 is a table showing estimated familiarity levels of portable communication devices in an area, in accordance with some embodiments.

FIG. 4 is a table 400 showing exemplary estimated familiarity levels of portable communication devices in an area, in accordance with some embodiments. Table 400 includes columns 402, 404, 406, 408, 410, 412, and 414. In the illustrated example, column 402 includes a listing of entry numbers associated with the portable communication devices (for example 102, 104, 106, and 108). For example, the entry numbers shown in FIG. 4 are listed as Device_1, Device_2, Device_3, and Device_4, representing portable communication devices 102, 104, 106, and 108, respectively. In the illustrated example, column 404 includes a listing of the media access control addresses 404_1, 404_2, 404_3, and 404_4 of the corresponding portable communication devices Device_1, Device_2, Device_3, and Device_4, listed in column 402. For example, the media access control addresses corresponding to Device_1, Device_2, Device_3, and Device_4 are listed as A4-C4-94-C6-A8-12; FC-3F-DB-A3-1D-14; D2-62-E9-A1-54-90; and 94-F3-E2-6D-2A-32, respectively. In the illustrated example, column 406 includes a listing showing how often the portable communications devices listed in column 402 visited a particular area within the building 100. For example, the Device_1, Device_2, Device_3, and Device_4 are listed to be as often as "Every Working Day," "Every Week," "Every Month," and "First Time Visit," respectively. In the illustrated example, column 408 includes a listing showing the last time the portable communication devices listed in column 402 visited a particular area within the building 100. For example, the Device_1, Device_2, Device_3, and Device_4 are listed to have last visited a particular area within the building 100 on "5/19/2016," "5/13/2016," "4/18/2016," and "None," respectively. In the illustrated example, column 408 shows that Device_1 may have a greater level of familiarity with the building 100 than Device_2, Device_3 and Device_4 based on the last visit time associated with the last time of capture of the corresponding over-the-air identifiers. In one example, although Device_3 visits the building 100 every month and has a relatively high familiarity level with the building, the building may have been changed (for example, as a result of reconfiguration or remodeling) since the last visit. Therefore, the estimated familiarity level may be set to "Low" to reflect that the user of Device_3 may not be familiar with the changes to the building that have taken place since the last visit of the user having Device_3.

In the illustrated example, column 410 includes a count of the number of times the over-the-air identifier of portable communication devices 102, 104, 106, and 108 was received by one or more sensors 121, 131, 141, 151, and 161. In the illustrated example, column 412 includes an estimated familiarity level associated with each of the portable communication devices based on how often the portable communication device has visited a particular area within the building 100. For example, Device_1, Device_2, Device_3, and Device_4 are listed with an "Estimated Familiarity Level" within the building 100 as "Extremely High," "High," "Low," and "Extremely Low," respectively. In one embodiment, column 414 includes a priority level associated with each of the portable communication devices based on the familiarity level associated with each of the portable communication devices. In the illustrated example, Device_1, Device_2, Device_3, and Device_4 are listed with a priority level of "Extremely Low," "Low," "High" and "Extremely High," respectively. The portable communication device (Device_1) that has the most familiarity with the areas within the building 100 is assigned the "Lowest" priority level whereas the portable communication device (Device_4) that has the least familiarity with the areas within the building 100 is assigned the "Highest" priority level.

Figure 5:
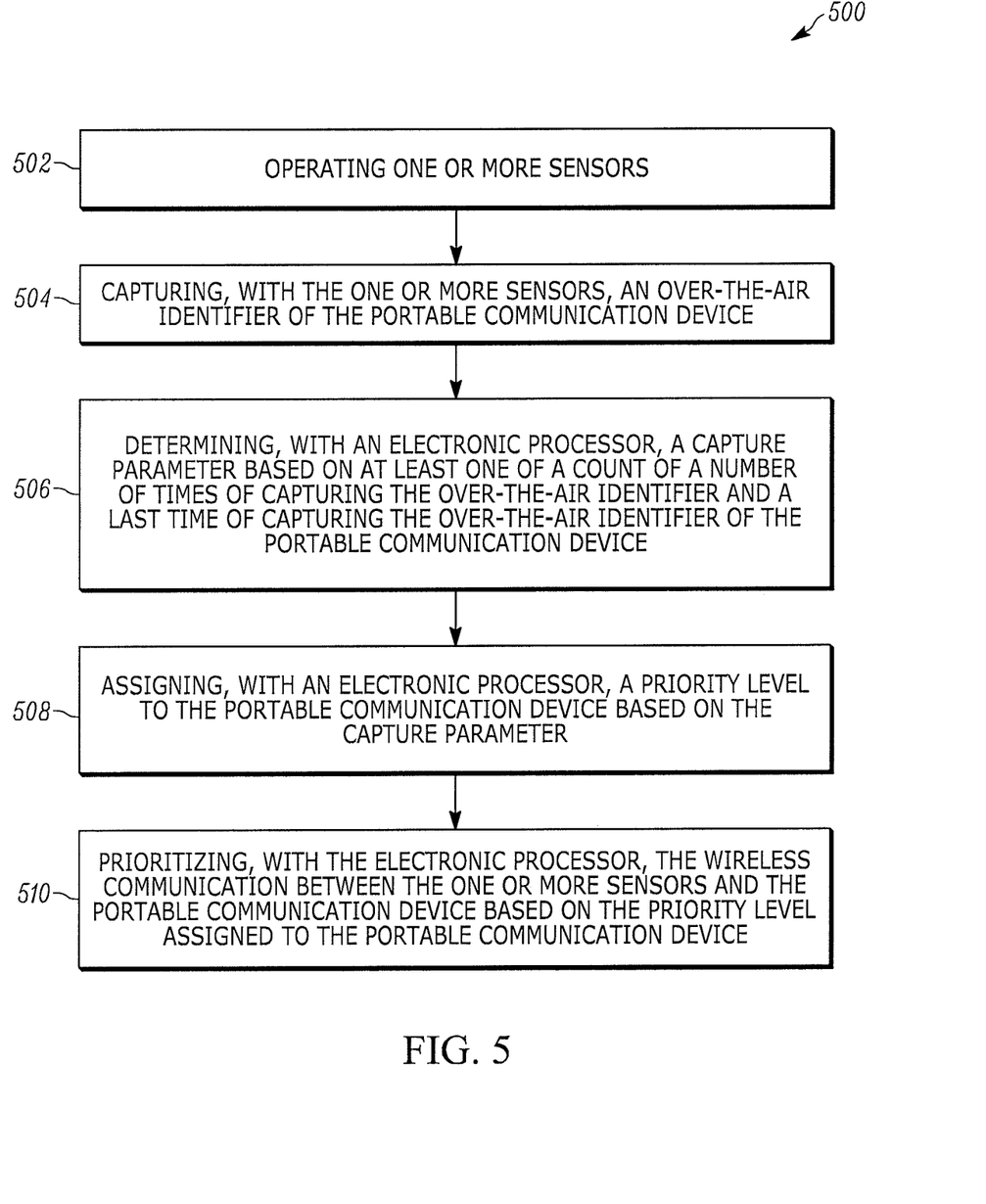
FIG. 5 is a flow chart of a method for prioritizing wireless communication to a portable communication device in accordance with some embodiments.

FIG. 5 is a flow chart of a method 500 for prioritizing wireless communication to a portable communication device 102, 104, 106, and 108 (shown in FIG. 1), in accordance with some embodiments. At block 502, the method 500 includes operating one or more sensors (121, 131, 141, 151, and 161). In an example, the sensors 121, 131, 141, 151, and 161 are placed in locations within the building 100 to enable capturing of over-the-air identifiers from portable communication devices 102, 104, 106, and 108 operating in various areas in the building 100. In one embodiment, the placement the sensors 121, 131, 141, 151, and 161 in locations is based on one or more evacuation routes assigned to the building 100. In one example, at block 502, the method 500 includes operating a long term evolution (LTE) receiver for international mobile equipment identity (IMEI) tracking. In another example, at block 502, the method 500 includes operating one or more wireless routers. In yet another example, at block 502, the method 500 includes operating one or more Bluetooth low energy beacons.

At block 504, the method 500 includes capturing, with the one or more sensors 121, 131, 141, 151, and 161, an over-the-air identifier of the portable communication device 102, 104, 106, and 108. In one example, at block 504 the method 500 includes capturing a media access control (MAC) address. In another example, at block 504 the method 500 includes capturing an international mobile equipment identity (IMEI) number. As the users of portable communication devices 102, 104, 106, and 108 move around the building 100, the sensors 121, 131, 141, 151, and 161 capture the over-the-air identifiers associated with the portable communication devices 102, 104, 106, and 108 that the users have in their possession. In one embodiment, the captured over-the-air identifiers are tabulated, for example, within the table 400 (shown in FIG. 4). For example, the information related to portable communication devices 102, 104, 106, and 108 may be listed under Device_1, Device_2, Device_3, and Device_4 respectively.

At block 506, the method 500 includes determining a capture parameter based on at least one of a count of a number of times of capturing the over-the-air identifier and a last time of capturing the over-the-air identifier of the portable communication device. In one example, one or more of the sensors 121, 131, 141, 151, and 161 track the number of times they receive the over-the-air identifiers associated with portable communication devices 102, 104, 106 and 108 over a particular time period and determine the number of times the over-the-air identifiers were captured by the one or more sensors 121, 131, 141, 151, and 161. In some embodiments, the number of times the over-the-air identifier is captured may be associated with various familiarity levels that are listed in column 410 of the table 400 in FIG. 4. In an example, if the number of times the over-the-air identifier was captured is over a certain threshold, the estimated familiarity for the corresponding portable communication device may be identified as "Extremely High" or "High" (as shown in 410, FIG. 4). Similarly, if the number of times the over-the-air identifier was captured is below a certain threshold, the estimated familiarity for the corresponding portable communication device may be identified as "Extremely Low" or "Low."

At block 508, the method 500 includes assigning, with the electronic processor 202, a priority level (for example, the familiarity level shown in column 412 of the table 400 in FIG. 4) to the portable communication device 102, 104, 106, and 108 based on a count of the number of times (for example, as shown in column 410 of the table 400 in FIG. 4) of capturing the over-the-air identifier. In one example, the priority level may be assigned to the portable communication devices 102, 104, 106, and 108 based on a duration of communication between the portable communication device 102, 104, 106, and 108 and the one or more sensors 121, 131, 141, 151, and 161.

At block 510, the method 500 includes prioritizing, with the electronic processor 202, the wireless communication between the one or more sensors 121, 131, 141, 151, and 161, and the portable communication devices 102, 104, 106, and 108 based on the priority level assigned to each of the portable communication devices 102, 104, 106, and 108. In an example, prioritizing is accomplished by assigning a quality of service (QoS) for a communication channel (for example, using guaranteed bit rate (GBR) bearers, multi-protocol label switching, IEEE 802.1p, IEEE 802.11e, and other suitable protocols to prioritize wireless network communications) between the one or more sensors 121, 131, 141, 151, and 161 and the portable communication devices 102, 104, 106, and 108. In an example, the quality of service for the communication channel is assigned such that it is inversely proportional to the count of the number of times the over-the-air identifier of the portable communication devices 102, 104, 106, and 108 is received at the sensor 121, 131, 141, 151, and 161. In another example, the quality of service for the communication channel between the one or more sensors 121, 131, 141, 151, and 161 is assigned based on the familiarity level associated with the portable communication devices 102, 104, 106, and 108. When a portable communication device (for example, Device_1) has an "Extremely high" familiarity level then the quality of service assigned to that portable communication device would be at placed at the "Lowest" level 414_1. When a portable communication device (for example, Device_4) has an "Extremely low" familiarity level then the quality of service assigned to that portable communication device would be at placed at the "Highest" level 414_4.

Figure 6:
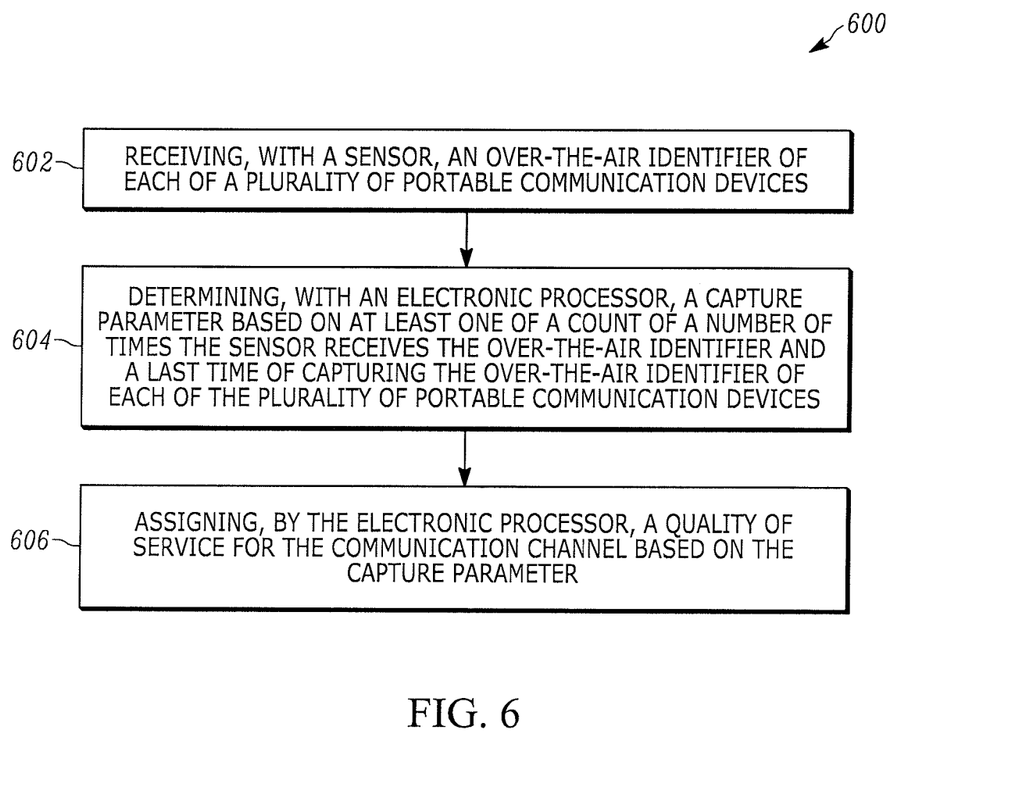
FIG. 6 is a flow chart of a method for controlling a communication channel during a congestion period in accordance with some embodiments.

FIG. 6 is a flow chart of a method 600 for controlling a communication channel during a congestion period in accordance with some embodiments.

At block 602, the method 600 includes receiving, with a sensor (for example, sensor 121 in FIG. 1), an over-the-air identifier of each of a plurality of portable communication devices 102, 104, 106, and 108.

At block 604, the method 600 includes determining, with an electronic processor (for example, the electronic processor 202 in FIG. 3), a capture parameter based on at least one of a count of a number of times the sensor 121 receives the over-the-air identifier and a last time of capturing the over-the-air identifier of the portable communication device of each of the plurality of portable communication devices 102, 104, 106, and 108. In one embodiment, the last time of capturing the over-the-air identifier of the portable communication device may indicate the level of familiarity that the user of the portable communication device may have with respect to building 100. For example, as shown in FIG. 4, Device_1 last visited building 100 whereas Device_3 last visited building 100 on 4/18/2016. As a result, Device_1 may be considered to have a greater familiarity with the building and hence the familiarity level for Device_1 is set to "Extremely High" versus Device_3, which may have the familiarity level assigned to "Low."

At block 606, the method 600 includes assigning, by the electronic processor, a quality of service for the communication channel based on the count of the number of times the sensor (for example, 121 in FIG. 1) receives the over-the-air identifier of each of the plurality of portable communication devices 102, 104, 106, and 108.

In one embodiment, the method 600 includes prioritizing a wireless communication between the sensor 121 and each of the plurality of portable communication devices 102, 104, 106, and 108 based on a priority level associated with each of the portable communication devices 102, 104, 106, and 108. In an example, the priority level (for example, 414_1, 414_2, 414_3, and 414_4 of the table 400 in FIG. 4) may be assigned based on the count of the number of times the sensor receives the over-the-air identifier (for example, 404_1, 404_2, 404_3, and 404_4 of the table 400 in FIG. 4)

of each of the plurality of portable communication devices 102, 104, 106, and 108. For example, the portable communication device having an over-the-air identifier A4-C4-94-C6-A8-12 (404_1 in FIG. 4) may be assigned the "Lowest" priority level for wireless communication with the sensors 121, 141, 151, and 161 during an evacuation scenario. Similarly, in one example, the portable communication device having an over-the-air identifier 94-F3-E2-6D-2A-32 (404_4 in FIG. 4) may be assigned the "Highest" priority level for wireless communication with the sensors 121, 141, 151, and 161 during the evacuation scenario.

In another embodiment, the method 600 includes sending an evacuation message to a plurality of portable communication devices 102, 104, 106, and 108 based on at least one of the number of times the sensor receives the over-the-air identifier and the last time of capturing the over-the-air identifier of each of the plurality of portable communication devices 102, 104, 106, and 108. In one example, the evacuation message is sent as a broadcast evacuation message to each of the plurality of portable communication devices 102, 104, 106, and 108. In another example, the evacuation message is sent as an individually customized evacuation message to each of the plurality of portable communication device 102, 104, 106, and 108. For example, for the lower familiarity level evacuees, the customized evacuation message may include more detailed evacuation routing information, more detailed hazardous location warnings, and multimedia (for example, videos and images) related to evacuation routing information. On the other hand, the higher familiarity level evacuees may be provided with more general information for evacuation routing and hazardous location warnings, and such information and warnings may be presented using text instead of video or images. By transmitting more general information (for example, an instruction to proceed to a particular meeting place) using text to evacuees having higher familiarity with the building, more bandwidth is available to transmit more specific information using multimedia (for example, detailed routing information and a map indicating a particular meeting place) to evacuees having less familiarity with the building.

In some embodiments, the method 600 includes monitoring a real-time evacuation status (for example, using data received from a heart rate sensor, a blood pressure sensor, or a user's indoor location sensor) for a number of evacuees leaving building 100. In one embodiment, the method 600 includes querying or polling the evacuation status for evacuees having a low familiarity of the building 100 more frequently than the evacuees having a high familiarity of the building 100. In one example, a portable communication device 102, 104, 106, and 108 associated with an evacuee having a low familiarity of the building 100 may update its evacuation status more frequently than a portable communication device 102, 104, 106, and 108 associated with an evacuee having a high familiarity of the building 100. In another example, the frequency of updates related to an evacuation status sent from the portable communication device 102, 104, 106, and 108 to the one or more sensors 121, 131, 141, 151, and 161 is based on a priority level assigned to the portable communication device 102, 104, 106, and 108. In yet another example, the frequency of queries (for example, the queries are related to determining an evacuation status) sent from the one or more sensors 121, 131, 141, 151, and 161 to the portable communication device 102, 104, 106, and 108.

It should be noted that a plurality of hardware and software based devices, as well as a plurality of different structural components may be utilized to implement the invention. In some embodiments, the invention provides a software application that is executable on a personal computing device, such as a smart phone, tablet computer, smart watch, etc. In some embodiments, the software application may be stored and executed by a remote computing device, such as a server. In particular, the software application may be executed by a server, and a user can access and interact with the software application using a portable communication device. Also, in some embodiments, functionality provided by the software application as described above may be distributed between a software application executed by a user's portable communication device and a software application executed by another electronic process or device (for example, a server) external to the portable communication device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for prioritizing a wireless communication to a portable communication device, the method comprising:
    operating one or more sensors;
    capturing, with the one or more sensors, an over-the-air identifier of the portable communication device;
    determining, with an electronic processor, a capture parameter based on at least one of a count of a number of times of capturing the over-the-air identifier and a last time of capturing the over-the-air identifier of the portable communication device;
    assigning, with the electronic processor, a priority level to the portable communication device based on the capture parameter; and
    prioritizing, with the electronic processor, the wireless communication between the one or more sensors and the portable communication device based on the priority level assigned to the portable communication device.

2. The method of claim 1, wherein a frequency of queries sent from the one or more sensors to the portable communication device is based on the priority level, and wherein the queries are related to determining an evacuation status.

3. The method of claim 1, wherein a frequency of updates of an evacuation status sent from the portable communication device to the one or more sensors is based on the priority level.

4. The method of claim 1, wherein the priority level assigned to the portable communication device is based on a duration of communication between the portable communication device and the one or more sensors.

5. The method of claim 1, wherein a quality of service of the communication channel associate associated with the wireless communication is inversely proportional to the count of the number of times the over-the-air identifier of the portable communication device is received at the one or more sensors.

6. The method of claim 1, wherein capturing the over-the-air identifier includes capturing a media access control address.

7. The method of claim 1, wherein capturing the over-the-air identifier includes capturing an international mobile equipment identity number.

8. The method of claim 1, wherein operating one or more sensors includes operating one or more Bluetooth low energy beacons.

9. A sensor comprising:
    an electronic processor configured to:
    capture an over-the-air identifier of a portable communication device;
    determine a capture parameter based on at least one of a count of a number of times of capture of the over-the-air identifier and a last time of capturing the over-the-air identifier of the portable communication device;
    assign a priority level to the portable communication device based on the capture parameter; and
    prioritize a wireless communication between the sensor and the portable communication device based on the priority level assigned to the portable communication device.

10. The sensor of claim 9, wherein the over-the-air identifier includes a media access control address.

11. The sensor of claim 9, wherein the over-the-air identifier includes an international mobile equipment identity number.

12. The sensor of claim 9, wherein the sensor comprises a wireless router.

13. The sensor of claim 9, wherein the sensor comprises a Bluetooth low energy beacon.

14. The sensor of claim 9, wherein the sensor comprises a long term evolution receiver.

15. The sensor of claim 9, wherein the electronic processor is communicatively coupled to a data storage configured to store the over-the-air identifier and the count of the number of times of capture of the over-the-air identifier.

16. A method of controlling a communication channel during a congestion period, the method comprising:
    receiving, with a sensor, an over-the-air identifier of each of a plurality of portable communication devices;
    determining, with an electronic processor, a capture parameter based on at least one of a count of a number of times the sensor receives the over-the-air identifier and a last time of capturing the over-the-air identifier of each of the plurality of portable communication devices; and assigning, by the electronic processor, a quality of service for the communication channel based on the capture parameter.

17. The method of claim 16, further comprising:
prioritizing a wireless communication between the sensor and each of the plurality of portable communication devices based on a priority level associated with each of the portable communication devices, the priority level assigned based on the count of the number of times the sensor receives the over-the-air identifier of each of the plurality of portable communication devices.

18. The method of claim 16, further comprising:
sending an evacuation message to the plurality of portable communication devices based on at least the number of times the sensor receives the over-the-air identifier and the last time of capturing the over-the-air identifier of each of the plurality of portable communication devices.

19. The method of claim 18, wherein sending an evacuation message to the plurality of portable communication devices includes sending a broadcast evacuation message to each of the plurality of portable communication devices.

20. The method of claim 18, wherein sending an evacuation message to the plurality of portable communication devices includes sending an individually customized evacuation message to each of the plurality of portable communication devices.

* * * * *